(No Model.)

S. C. HILL & H. D. CROOKER.
CLOTHES POUNDER.

No. 334,379. Patented Jan. 12, 1886.

Witnesses,
W. J. Dennis
Fred F. Rost

Inventor,
Samuel C. Hill
Herman D. Crooker

UNITED STATES PATENT OFFICE.

SAMUEL C. HILL, OF RICHMOND, INDIANA, AND HEMAN D. CROOKER, OF BATTLE CREEK, MICHIGAN.

CLOTHES-POUNDER.

SPECIFICATION forming part of Letters Patent No. 334,379, dated January 12, 1886.

Application filed January 24, 1884. Serial No. 118,557. (No model.)

*To all whom it may concern:*

Be it known that we, SAMUEL C. HILL and HEMAN D. CROOKER, citizens of the United States, residing, respectively, at Richmond, in the county of Wayne and State of Indiana, and at Battle Creek, in the county of Calhoun and State of Michigan, have invented certain new and useful Improvements in Clothes-Pounders, of which the following is a specification, reference being had therein to the accompanying drawings.

Our invention relates to that class of washers in which the water is forced through and into the clothing by pressure.

Figure 1:
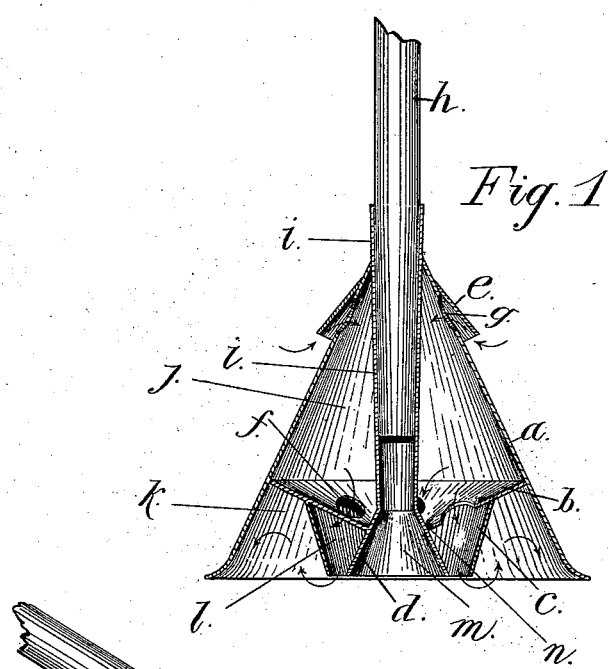
Figure 2:
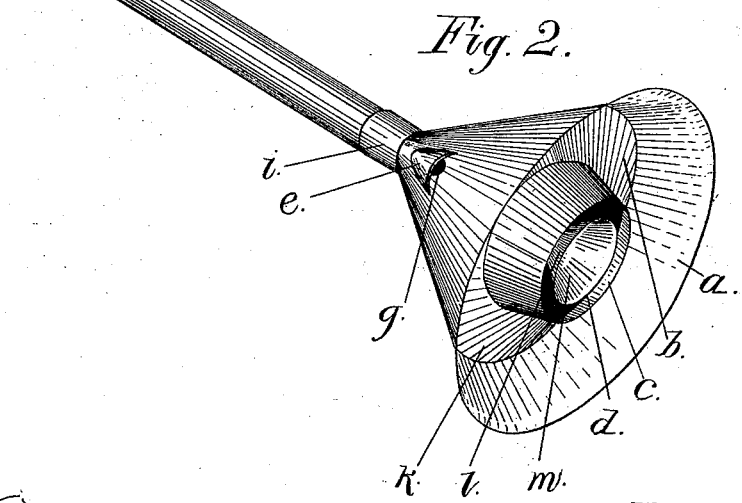

In the drawings which accompany this specification and form a part thereof, Figure 1 is a vertical section of our improved washer. Fig. 2 is a perspective view of the same.

A represents the main body of our improved clothes-pounder, the same consisting of a conical case provided at its upper end with a socket, $i$, depending into the interior thereof, said socket being for the reception of a suitable handle, $h$. $b$ represents a concave plate fitting within the case A at a suitable distance above its base, the same being provided with two or more openings, $n$, at equidistant points from its center, the socket $i$ rising from the plate $b$ at about the point where such openings are formed. Secured at its upper edge to the plate $b$, and projecting or inclining downward or inward therefrom, is a rim, $c$, which extends nearly to a line with the plane of the base of the casing. Within the circumference of the rim $c$ is constructed a funnel or conical-shaped cup, $d$, forming a chamber or space, $m$, said cup being secured or attached at its upper edge to the plate $b$. Near the upper end of the body or casing A, and on the outer surface thereof, semicircular ears $e$ are attached, the same acting to partially inclose the openings $g$ in said body. That portion of the body within, above the plate $b$, forms an air-chamber, $j$, in the walls of which the above-mentioned openings $g$ are formed, the said plate $b$, which constitutes the bottom of such air-chamber, being provided with the openings $n$. These openings allow the air in the space formed by rim $c$ to escape up into the upper air-chamber mentioned as the pounder is forced into the water. In this act or operation air and water are both forced through the openings $n$ by the movement imparted to the implement. The socket $i$ being closed by the handle $h$, it is evident how the cup $d$ is constituted an air-chamber, as also the space $k$, formed between rim $c$ and the sides of the casing, the space $l$, between cup $d$ and the rim $c$, communicating with the chamber $j$ by means of holes $f$ in the concave plate $b$. The ears $e$, serve to prevent the water forced into chamber $j$ from escaping upward.

Having thus described our invention, what we claim, and desire to secure by Letters Patent, is—

In a clothes-pounder, the combination of a cone-shaped case having openings in the side near its apex, and provided with socket $i$, for the reception of a handle, a concave plate attached to the inner circumference of the case above its base, having openings $f$ and $n$, the rim $c$ and cup $d$, all arranged in such manner as to form the several spaces or chambers specified.

In testimony whereof we affix our signatures in presence of two witnesses.

SAMUEL C. HILL.
HEMAN D. CROOKER.

Witnesses:
JOHN F. ROBBINS,
W. T. DENNIS.